(12) United States Patent
Fang

(10) Patent No.: US 7,682,065 B2
(45) Date of Patent: Mar. 23, 2010

(54) BACKLIGHT MODULE HAVING HOLDING DEVICE FOR HOLDING LIGHT SOURCE

(75) Inventor: Chien-Chung Fang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 182 days.

(21) Appl. No.: 11/998,065

(22) Filed: Nov. 27, 2007

(65) Prior Publication Data
US 2008/0123371 A1 May 29, 2008

(30) Foreign Application Priority Data
Nov. 27, 2006 (TW) ............................... 95220881 U

(51) Int. Cl.
*F21V 7/04* (2006.01)
*F21V 19/00* (2006.01)
(52) U.S. Cl. ...................... 362/634; 362/614
(58) Field of Classification Search ................ 362/634, 362/382, 614, 613, 633; 313/49; 174/138
See application file for complete search history.

(56) References Cited

U.S. PATENT DOCUMENTS

| 5,186,537 | A | | 2/1993 | Katoh et al. | |
|---|---|---|---|---|---|
| 5,797,675 | A | * | 8/1998 | Tanner, Jr. | 362/396 |
| 5,908,237 | A | * | 6/1999 | Devir et al. | 362/390 |
| 7,137,726 | B2 | * | 11/2006 | Lee et al. | 362/632 |
| 7,510,317 | B2 | * | 3/2009 | Murakami et al. | 362/634 |

* cited by examiner

*Primary Examiner*—Jacob Y Choi
(74) *Attorney, Agent, or Firm*—Wei Te Chung

(57) ABSTRACT

An exemplary backlight module (20) includes a light source (23), a light guide plate (21), a light source reflector (22), and a holding device (24). The light guide plate includes a light incident surface (211). The light source is disposed adjacent to the light incident surface. The light source reflector attaches to the light guide plate, and includes a fixing hole (224). The holding device engages with the light source reflector at the fixing hole and restrains the light source in position a predetermined maximum distance away from the light source reflector.

16 Claims, 3 Drawing Sheets

US 7,682,065 B2

BACKLIGHT MODULE HAVING HOLDING DEVICE FOR HOLDING LIGHT SOURCE

FIELD OF THE INVENTION

The present invention relates to a backlight module having a holding device which is used to hold a light source to a light source reflector of the backlight module.

GENERAL BACKGROUND

Liquid crystal displays are commonly used as display devices for compact electronic apparatuses. This is because they not only provide good quality images with little power consumption, but also they are very thin. The liquid crystal in a liquid crystal display cannot emit light itself. The liquid crystal needs be lit by a light source, so as to clearly and sharply display text and images. Thus, a backlight module for an LCD is generally needed.

Referring to FIG. 5, a typical backlight module 10 includes a light guide plate 14, a reflector 11, two lamps 12, and at least one figure of eight-shaped ring 13. The light guide plate 13 includes a light incident surface 141, a light emitting surface 142, and a bottom surface 143. The light incident surface 141 is perpendicular to both the light emitting surface 142 and the bottom surface 143. The bottom surface 143 is parallel to the light emitting surface 143. The reflector 11 includes a side wall 111 and two arms 112, 113. The two arms 112, 113 perpendicularly extend from the side wall 111 in a same direction. The two arms 112, 113 abut an end portion (not labeled) of the light emitting surface 142 and an end portion (not labeled) of the bottom surface 143 respectively, thereby defining a space 15 between the light incident surface 141 and the reflector 11. The lamps 12 are received in the space 15, in order to provide light beams to the light incident surface 141 of the light guide plate 14. The lamps 12 are linear and are parallel to each other. The figure of eight-shaped ring 13 is used to fix the two lamps 12. End portions (not shown) of the lamps 12 are fixed with rubber caps (not shown). The lamps 12 are typically cold cathode fluorescent lamps (CCFLs).

Some modern liquid crystal displays, such as liquid crystal display televisions, are being made very large. Correspondingly, these liquid crystal displays require long lamps 12. However, long lamps 12 are liable to bend. In addition, the lamps 12 are particularly susceptible to breakage when subjected to shock. Furthermore, if the lamps 12 bend toward the light incident surface 141 and touch the light guide plate 14, the backlight module 10 is liable to produce a white-dot phenomenon. That is, the quality of light output by the backlight module 10 is impaired.

What is needed, therefore, is a backlight module that can overcome the above-described deficiencies.

SUMMARY

In one preferred embodiment, a backlight module includes a light source, a light guide plate, a light source reflector, and a holding device. The light guide plate includes a light incident surface. The light source is disposed adjacent to the light incident surface. The light source reflector attaches to the light guide plate, and includes a fixing hole. The holding device engages with the light source reflector at the fixing hole and restrains the light source in position a predetermined maximum distance away from the light source reflector.

Other novel features and advantages of the present backlight module will become more apparent from the following detailed description when taken in conjunction with the accompanying drawings. In the drawings, all the views are schematic.

DETAILED DESCRIPTION OF PREFERRED EMBODIMENTS

Figure 1:
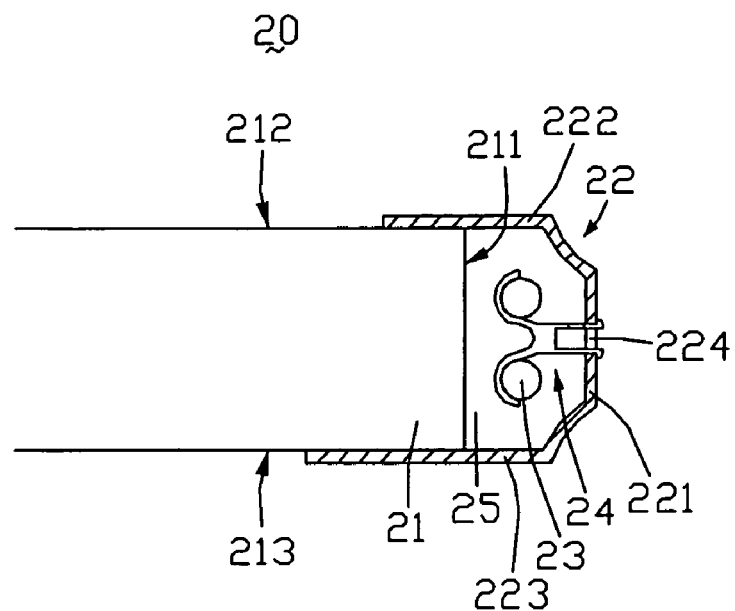
FIG. 1 is a cross-sectional view of part of a backlight module according to a first embodiment of the present invention, the backlight module including a holding device.

Reference will now be made to the drawing figures to describe various embodiments of the present invention in detail.

Referring to FIG. 1, a backlight module 20 according to a first embodiment of the present invention includes a light guide plate 21, a reflector 22, two lamps 23, and a holding device 24. The light guide plate 21 includes a top light emitting surface 212, a light incident surface 211 adjacent and perpendicular to the light emitting surface 212, and a bottom surface 213. The reflector 22 includes a side wall 221 and two arms 222, 223. The two arms 222, 223 perpendicularly extend from the side wall 221 in a same direction. The side wall 221 includes a rectangular fixing hole 224 in a center thereof. The two arms 222, 223 abut an end portion (not labeled) of the light emitting surface 212 and an end portion (not labeled) of the bottom surface 213 respectively, thereby defining a space 25 between the light incident surface 211 and the reflector 22. The lamps 23 are received in the space 25 in order to provide light beams to the light incident surface 211 of the light guide plate 21. The holding device 24 is engaged in the fixing hole 224, and thereby fixes the lamps 23 to the reflector 22. The two lamps 23 are linear, and are parallel to each other. End portions of the lamps 23 are fixed with rubber caps (not shown). The lamps 23 are typically cold cathode fluorescent lamps (CCFLs).

Figure 2:
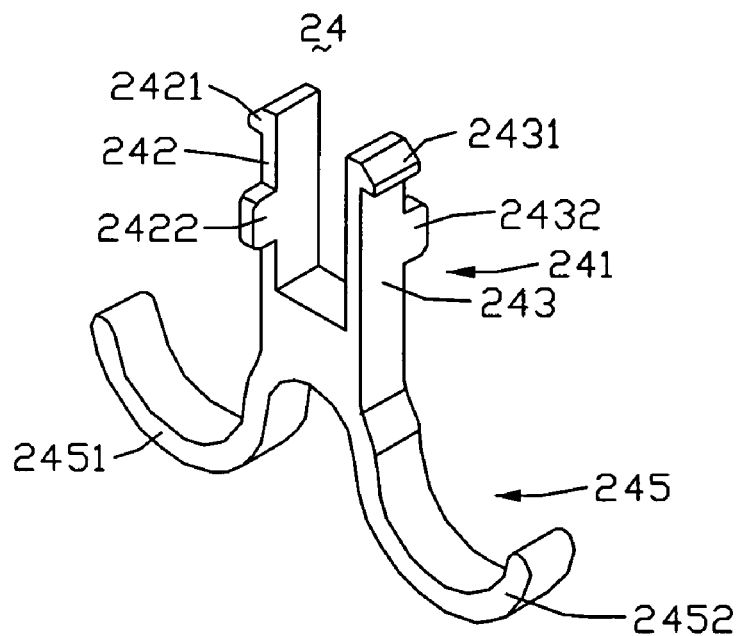
FIG. 2 is an isometric view of the holding device of FIG. 1.

Referring also to FIG. 2, the holding device 24 includes a U-shaped fixing portion 241 and a holding portion 245. The holding portion 245 is integrally connected to a base body (not labeled) of the fixing portion 241. The fixing portion 241 is used to fix the holding device 24 to the side wall 221 of the reflector 22. The holding portion 245 is used to prevent the lamps 23 from bending toward the light guide plate 21.

The fixing portion 241 includes a first fixing arm 242 and a second fixing arm 243 parallel to each other. The first fixing arm 242 includes a first protrusion 2421 extending from an end portion thereof, and a first block 2422 extending from a middle portion thereof. The second fixing arm 243 includes a second protrusion 2431 extending from an end portion thereof, and a second block 2432 extending from a middle portion thereof. The first protrusion 2421 and the second protrusion 2431 extend perpendicularly from end portions of the first fixing arm 242 and the second fixing arm 243 in opposite directions. The first block 2422 and the second block 2432 extend perpendicularly from middle portions of the first fixing arm 242 and the second fixing arm 243, but in opposite directions. The first protrusion 2421 is perpendicular to the first block 2422. The second protrusion 2431 is perpendicular to the second block 2432. The first fixing arm 242 and the second fixing arm 243 are flexible, and can be made from transparent resin such as polymethyl methacrylate (PMMA) or polycarbonate (PC). That is, the entire holding device 24 can be molded as a single piece of PMMA or PC.

A minimum distance between the first fixing arm 242 and the second fixing arm 243 is approximately equal to a width of the fixing hole 224 of the reflector 22. A minimum distance between the first protrusion 2421 and the first block 2422 is approximately equal to a thickness of the side wall 221 of the reflector 22. A minimum distance between the second protrusion 2431 and the second block 2432 is also approximately equal to the thickness of the side wall 221.

The holding portion 245 includes a first holding arm 2451 and a second holding arm 2452. The first holding arm 2451 and the second holding arm 2452 extend downwardly and bend outwardly from the base body of the fixing portion 241. Cross-sections of the first holding arm 2451 and the second holding arm 2452 are substantially semicircular. Open sides of the first holding arm 2451 and the second holding arm 2452 generally face along a same direction in which the fixing arms 242, 243 extend from the base body. A diameter of the semicircles is approximately equal to a diameter of the lamps 23.

In assembly of the backlight module 20, the first fixing arm 242 and the second fixing arm 243 of the holding device 24 are inserted into the fixing hole 224. The first and second fixing arms 242, 243 elastically deform when the protrusions 2421, 2431 pass through the fixing hole 224, and then rebound. Thus the protrusions 2421, 2431 and the blocks 2422, 2432 cooperatively clip the side wall 221 and hold the holding device 24 in place. The lamps 23 are held by the holding arms 2452, 2451, so that the lamps 23 cannot bend toward the light incident surface 211 of the light guide plate 21. Consequently, a white-dot phenomenon is prevented from occurring. Furthermore, the lamps 23 are buffered by the various parts of the holding device 24, and are therefore less prone to break when the backlight module 20 is subjected to shock or vibration.

Figure 3:
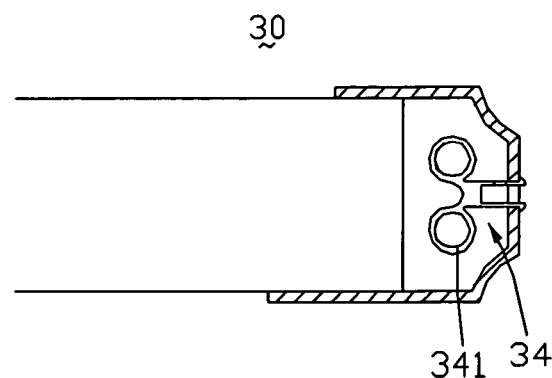
FIG. 3 is a cross-sectional view of part of a backlight module according to a second embodiment of the present invention.

Referring to FIG. 3, a backlight module 30 according to a second embodiment of the present invention is similar to the backlight module 20. However, cross-sections of holding arms 341 of a holding device 34 are circular. Lamps (not labeled) can be fixed firmly, and the reliability of the backlight module 30 is enhanced.

Figure 4:
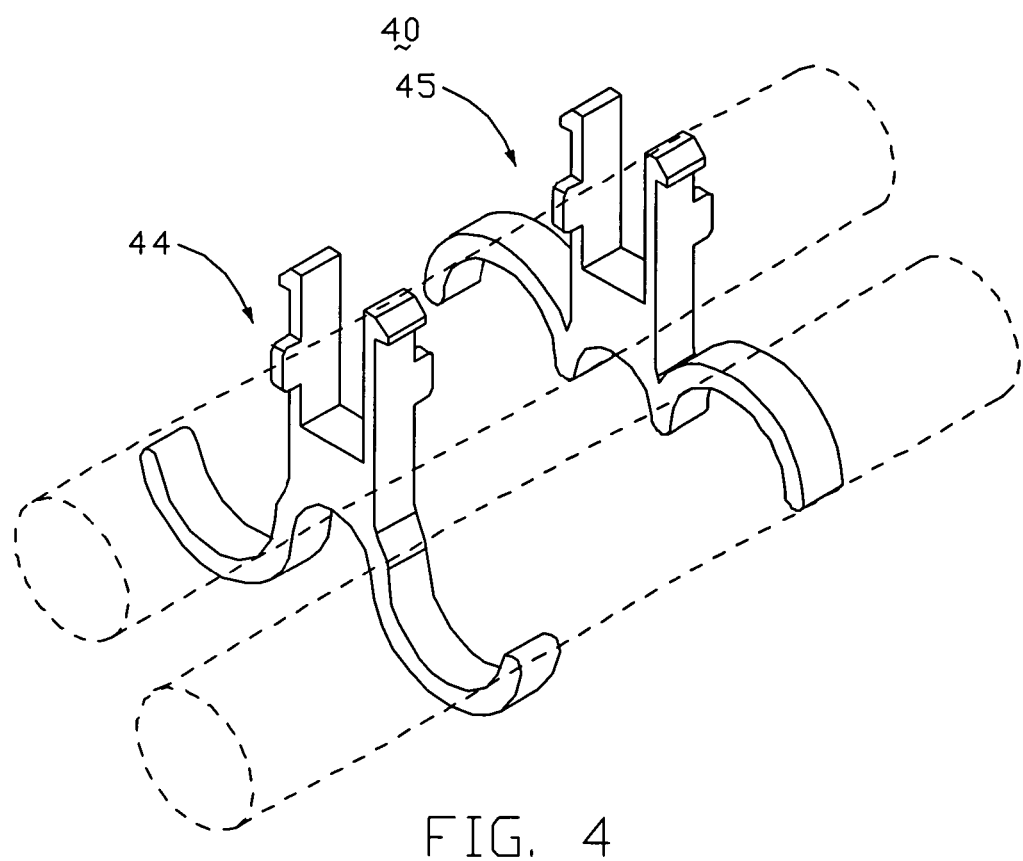
FIG. 4 is an isometric view of a pair of holding devices of a backlight module according to a third embodiment of the present invention.
Figure 5:
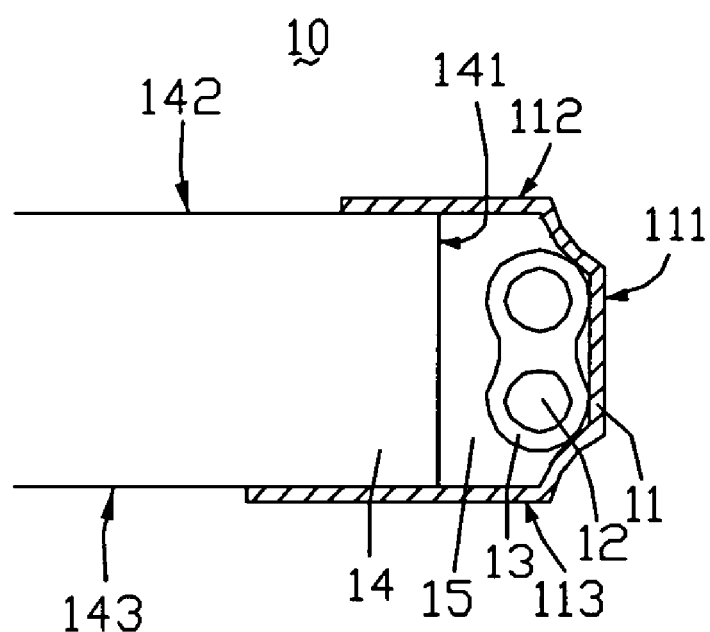
FIG. 5 is a cross-sectional view of part of a conventional backlight module.

Referring to FIG. 4, a backlight module 40 according to a third embodiment of the present invention is similar to the backlight module 20. However, the backlight module 40 includes a first holding device 44 and a second holding device 45. Correspondingly, a side wall (not shown) of a reflector (not shown) includes two fixing holes (not shown) to enable fixing of the two holding devices 44, 45 thereto. Open sides of two holding arms (not labeled) of the first holding device 44 generally face along a same direction in which fixing arms (not labeled) extend from a base body of the first holding device 44. Open sides of two holding arms (not labeled) of the second holding device 45 generally face along an opposite direction to a direction in which fixing arms (not labeled) extend from a base body of the second holding device 45. Lamps (not labeled) can be fixed firmly by the two holding devices 44, 45 in cooperation.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module comprising:
   a light guide plate comprising a light incident surface;
   a light source adjacent to the light incident surface;
   a light source reflector attached to the light guide plate, the light source reflector comprising a fixing hole;
   a first holding device engaged with the light source reflector at the fixing hole and restraining the light source in position a predetermined maximum distance away from the light source reflector, the first holding device comprising a fixing portion and a holding portion, the holding portion comprising a first holding arm and a second holding arm, the holding portion connected integrally to the fixing portion;
   a second holding device fixing the light source to the light source reflector, the second holding device comprising a plurality of holding arms, wherein an open direction of each of the holding arms of the second holding device is substantially opposite to an open direction of each of the first holding arm and the second holding arm of the first holding device;
   wherein the first holding arm and the second holding arm of the first holding device and the holding arms of the second holding device hold opposite sides of the light source; and
   wherein the fixing portion of the first holding device comprises a first fixing arm and a second fixing arm, the first fixing arm comprising a first protrusion extending from an end thereof and a first block extending from a middle portion thereof, the second fixing arm comprising a second protrusion extending from an end thereof and a second block extending from a middle portion thereof.

2. The backlight module as claimed in claim 1, wherein the light source comprises two lamps.

3. The backlight module as claimed in claim 2, wherein the two lamps are cold cathode fluorescent lamps (CCFLs).

4. The backlight module as claimed in claim 2, wherein cross-sections of the first holding arm and the second holding arm are semicircles.

5. The backlight module as claimed in claim 4, wherein a diameter of the semicircles is equal to a diameter of the lamps.

6. The backlight module as claimed in claim 1, wherein a facing direction of the first holding arm and the second holding arm is along an extending direction of the first fixing arm and the second fixing arm.

7. The backlight module as claimed in claim 1, wherein the first fixing arm and the second fixing arm are flexible.

8. The backlight module as claimed in claim 1, wherein the first fixing arm and the second fixing arm are made from polymethyl methacrylate (PMMA) or polycarbonate (PC).

9. The backlight module as claimed in claim 1, wherein the light source reflector further comprises a side wall, and the fixing hole is disposed in the side wall.

10. The backlight module as claimed in claim 9, wherein the fixing hole is disposed in the center of the side wall.

11. The backlight module as claimed in claim 1, wherein a minimum distance between the first fixing arm and the second fixing arm substantially is equal to a width of the fixing hole.

12. The backlight module as claimed in claim 1, wherein the light source reflector further comprises a side wall, a minimum distance between the first protrusion and the first block substantially is equal to a thickness of the side wall, and a minimum distance between the second protrusion and the second block substantially is equal to a thickness of the side wall.

13. The backlight module as claimed in claim 1, wherein the light source reflector further comprises another fixing hole corresponding to the second holding device, and the second holding device and the another fixing hole cooperatively fix the light source to the light source reflector.

14. The backlight module as claimed in claim 13, wherein the second holding device further comprises a fixing portion comprising two fixing arms, and the open direction of each of the holding arms of the second holding device is substantially opposite to an extending direction of the fixing arms of the second holding device.

15. A backlight module comprising:
a light guide plate comprising a light incident surface;
a light source adjacent to the light incident surface;
a light source reflector attached to the light guide plate, the light source reflector comprising a fixing hole; and
a one-piece first holding device and a one-piece second holding device positioning the light source relative to the light source reflector, each of the first holding device and the second holding device comprising a fixing portion and a holding portion, the holding portions limiting movement of the light source toward the light incident surface, and the fixing portions fixing the first holding device and the second holding device to the light source reflector, the holding portions of each of the first and second holding devices comprising a plurality of holding arms:
wherein an open direction of each of the holding arms of the second holding device is substantially opposite to an open direction of each of the holding arms of the first holding device;
the holding arms of the first holding device and the holding arms of the second holding device hold opposite sides of the light source; and
wherein the holding portions are connected integrally to the fixing portions.

16. The backlight module as claimed in claim 15, wherein the fixing portion of each of the first holding device and the second holding device comprises a first fixing arm and a second fixing arm, the first fixing arm comprising a first protrusion extending from an end thereof and a first block extending from a middle portion thereof, the second fixing arm comprising a second protrusion extending from an end thereof and a second block extending from a middle portion thereof.

* * * * *